US011512679B2

(12) United States Patent
Alexander

(10) Patent No.: US 11,512,679 B2
(45) Date of Patent: Nov. 29, 2022

(54) OCEAN WIND SYSTEMS, SUBSYSTEMS, AND METHODS WITH STABILIZATION BY ASSEMBLIES OF DEEP-WATER-MASSES WITH ARTICULATING FLOATS

(71) Applicant: William C. Alexander, Austin, TX (US)

(72) Inventor: William C. Alexander, Austin, TX (US)

( * ) Notice: Subject to any disclaimer, the term of this patent is extended or adjusted under 35 U.S.C. 154(b) by 15 days.

(21) Appl. No.: 15/931,569

(22) Filed: May 13, 2020

(65) Prior Publication Data
US 2021/0164446 A1 Jun. 3, 2021

Related U.S. Application Data

(60) Provisional application No. 62/846,987, filed on May 13, 2019.

(51) Int. Cl.
*F03D 13/25* (2016.01)
*F03D 9/30* (2016.01)
*F03D 9/25* (2016.01)
*B63B 1/12* (2006.01)
*B63B 35/44* (2006.01)

(52) U.S. Cl.
CPC .............. *F03D 13/25* (2016.05); *F03D 9/25* (2016.05); *F03D 9/30* (2016.05); *B63B 2001/128* (2013.01); *B63B 2035/446* (2013.01); *B63B 2241/08* (2013.01); *B63B 2241/16* (2013.01); *F05B 2220/706* (2013.01); *F05B 2240/93* (2013.01); *F05B 2240/95* (2013.01); *Y02E 10/727* (2013.01)

(58) Field of Classification Search
CPC .............. F03D 13/25; B63B 2001/128; B63B 203/446; B63B 2241/08; B63B 2241/16; F05B 2240/93
See application file for complete search history.

(56) References Cited

U.S. PATENT DOCUMENTS

| | | | | |
|---|---|---|---|---|
| 8,471,396 B2 * | 6/2013 | Roddier | ............... | F03D 13/10 290/44 |
| 2012/0073487 A1 * | 3/2012 | Pantaleon Prieto | .... | F03D 13/25 114/264 |
| 2012/0121414 A1 * | 5/2012 | Steinberg | ............... | F03D 3/067 416/17 |
| 2014/0300888 A1 * | 10/2014 | Duffey | ............... | G01S 7/497 356/28 |
| 2014/0322012 A1 * | 10/2014 | Steinberg | ............... | F03D 3/067 416/17 |
| 2017/0226984 A1 * | 8/2017 | Gregory | ............... | F03B 13/18 |

FOREIGN PATENT DOCUMENTS

| | | | | |
|---|---|---|---|---|
| ES | 2555500 A1 * | 1/2016 | ............ | B63B 21/20 |
| ES | 2555500 A1 | 1/2016 | | |

* cited by examiner

*Primary Examiner* — S. Joseph Morano
*Assistant Examiner* — Jovon E Hayes
(74) *Attorney, Agent, or Firm* — M. A. Ervin & Associates; Michael A. Ervin

(57) ABSTRACT

Methods and systems for operating a stable platform in a far-offshore deep-sea environment. The platform can advantageously be a wind power generation station. A structural framework carries (for example) the wind turbine in an elevated position. Multiple points on the floating structure are connected both to a surface float and to a deep mass (e.g. an enclosed volume of seawater).

11 Claims, 9 Drawing Sheets

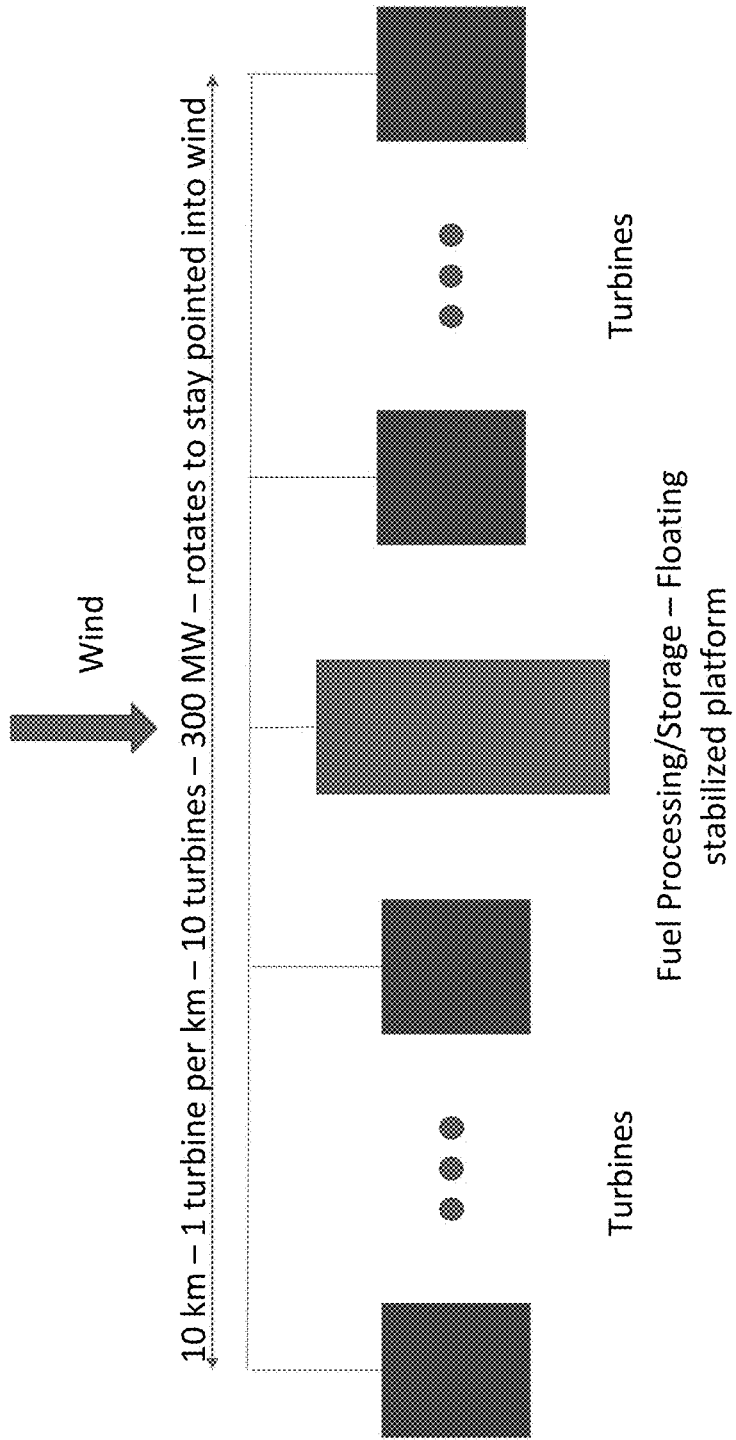
Fig.5 - Multiple Turbines to Fuel Processor – 300 MW

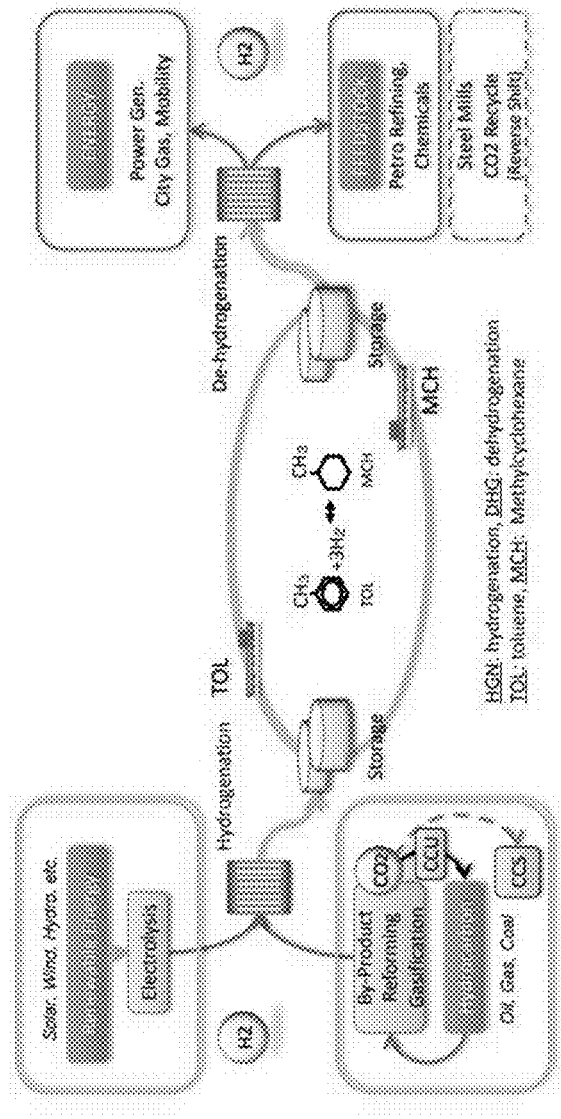
Fig. 6 – Liquid Organic Hydrocarbon Carrier (LOHC) Cycle

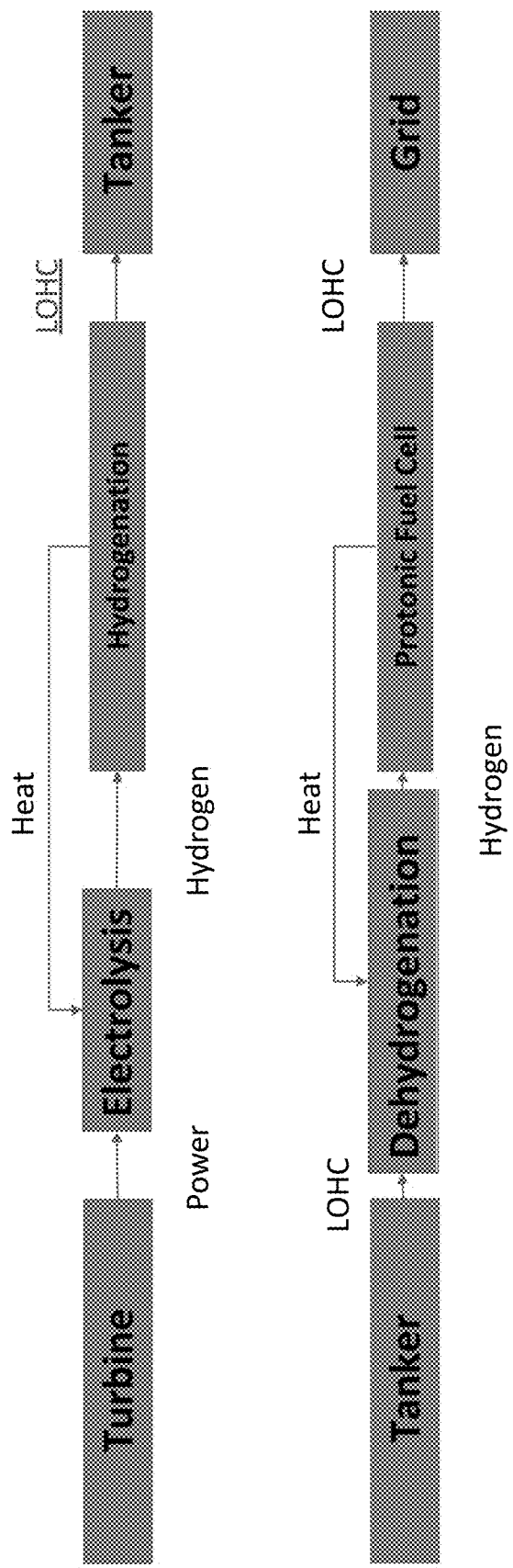
Fig.7 - Wind-to-Grid

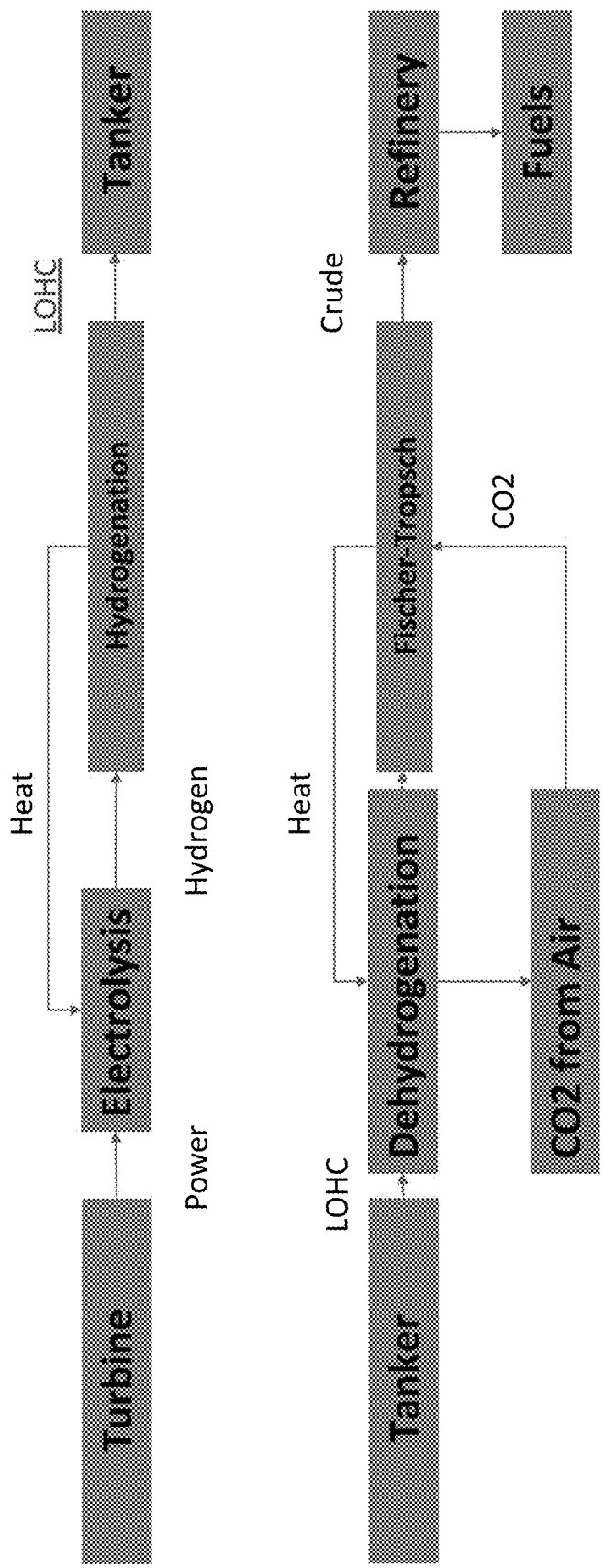
Fig.8 – Wind-to-Fuel

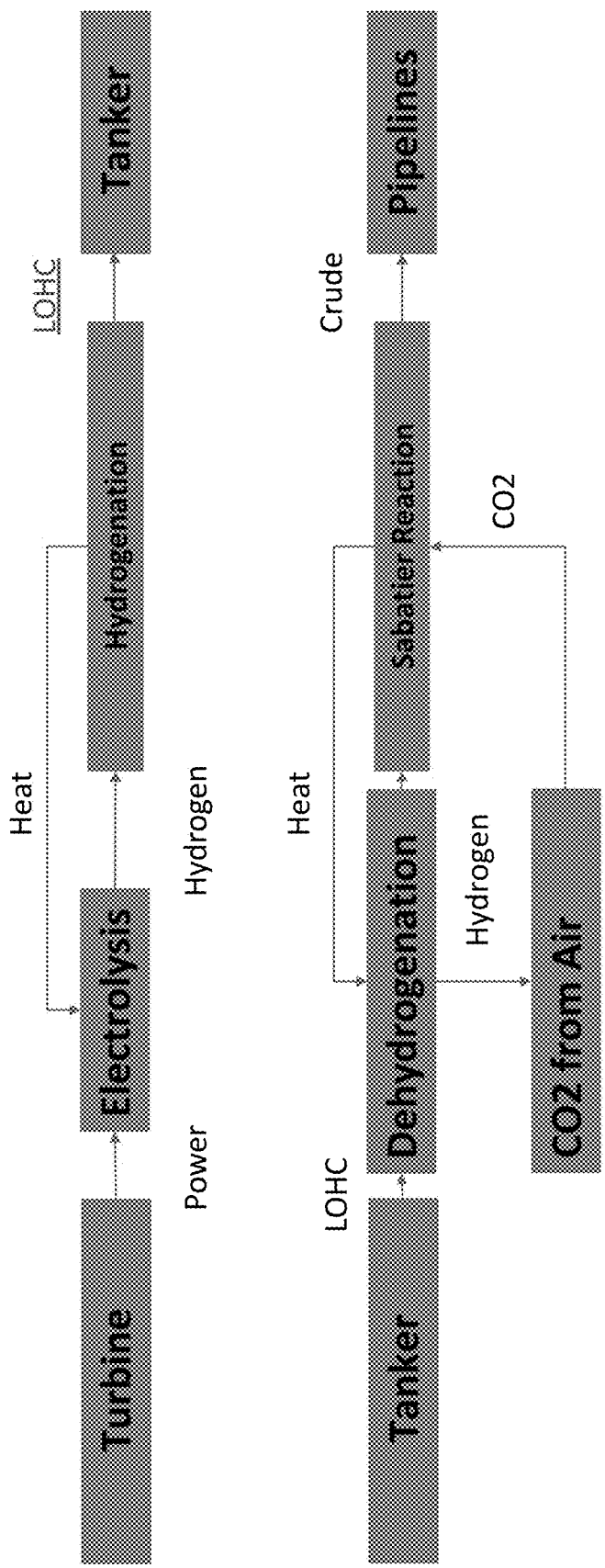
Fig.9 - Wind-to-Methane (Natural Gas)

OCEAN WIND SYSTEMS, SUBSYSTEMS, AND METHODS WITH STABILIZATION BY ASSEMBLIES OF DEEP-WATER-MASSES WITH ARTICULATING FLOATS

CROSS-REFERENCE

Priority is claimed from U.S. application 62/846,987 filed May 13, 2019, which is hereby incorporated by reference.

BACKGROUND

The present application relates to wind power generation, and also to systems operable in far-offshore ocean locations, and also to wind power generation in far-offshore ocean locations, as well as related methods.

Note that the points discussed below may reflect the hindsight gained from the disclosed inventions, and are not necessarily admitted to be prior art.

Wind turbine technology has developed rapidly, in land-based systems, to use a large-diameter rotating assembly on a high tower. As of 2016, typical figures might be: a tower height of 128 m, a blade path diameter of 109 m, with a rated output of a little less than 3 MW. However, a very large fraction of the wind energy near the Earth's surface is found in deep ocean regions which are far offshore, and it has not been clear how to adapt the conventional technology for use in such locations.

Offshore wind energy generation has already been used in relatively shallow waters, where anchors or tension legs can be used to stabilize the platform and keep it in position. However, these approaches will not work for deep waters where anchoring is not possible. The problem is not merely position-keeping, but also minimizing transient acceleration of the wind turbine. Since a very large fraction of the wind power available on Earth is remote from continental locations, wind energy gathering far offshore opens up a vast increase in wind energy collection.

The present application teaches, among other innovations, wind generation systems which support a turbine using a platform which is stable offshore, without any tethering or anchoring. This is achieved using a new kind of deep-water stabilization. Preferably a floating platform is stabilized by multiple points where vertical motion (heave) is resisted by the combination of a deep enclosed mass (e.g. a sphere of seawater at 100 m) with a buoyant element (such as vertically extended floats). The combination of the buoyant element with the deep enclosed mass defines a damped mechanical resonator. (The damping term is defined by the hydrodynamic resistance to vertical movement of the mechanical resonator.) The resonant frequency of the damped resonator system is preferably less than the period of any normal wave, which prevents any significant compliance with the wave frequencies.

An important realization behind the disclosed inventions is that the normal movements of a maritime vessel would be destructive (at least for current wind turbine designs). Roll and pitch, in particular, correspond to significant transient accelerations of a turbine which is high above the waterline.

The disclosed floating systems, including the stabilization subsystems, are also themselves believed to be new. The surprising stability of this open-ocean floating structure can also be used to enable other far-offshore operations.

The present application also teaches, among other innovations, methods for operating far-offshore stationary systems which are not tethered nor anchored. Also note that the stability achieved here is not merely position-keeping: the floating platform is effectively decoupled from wind and wave dynamics, for a very wide range of wind and sea state conditions.

The above innovations are implemented, in various disclosed embodiments, by combining a large structural framework or lattice on a floating body with stabilizers (damped mechanical resonators), at multiple points on the floating body, which include a large mass of water. Each of the stabilizers extends deeply enough that the large mass is not disturbed by wave motion. Preferably, but not necessarily, the taut connection between the large mass and the float includes a swivel joint; alternatively, this connection can be made sufficiently flexible that the float can be moved laterally, as waves pass, without moving the large mass vertically.

Note that the large mass in the stabilizers is submerged, is nominally neutrally buoyant, and therefore exerts relatively little force on the structure. Its dominant property is its mass, not its weight.

BRIEF DESCRIPTION OF THE DRAWINGS

The disclosed inventions will be described with reference to the accompanying drawings, which show important sample embodiments and which are incorporated in the specification hereof by reference, wherein:

FIG. 5 shows how multiple turbines can be connected to one fuel processing platform. In this example, ten 30 MW turbines are all connected to a single fuel processing platform.

FIG. 6 shows how such a platform can operate. In this example, liquid toluene is shipped out to the wind turbine platform, where it is stored for conversion. The power from the wind turbine is used to electrolyze seawater and generate hydrogen, and the hydrogen is used to alter the chemistry of the toluene to methylcyclohexane. (Other chemical processes can also be used to take up hydrogen for transport.) Such a cycle is referred to as a liquid organic hydrocarbon cycle ("LOHC").

FIG. 7 summarizes a complete wind-to-grid flow. Hydrogenation is performed at the far-offshore generation site, and the hydrogenated stock is transported to a shore facility for dehydrogenation. In this example, the hydrogen released by dehydrogenation feeds a protonic fuel cell, to directly generate DC power. This power is then converted and fed into the grid.

FIG. 8 shows a different cycle, where the recovered hydrogen is fed into a Fischer-Tropf process, along with atmospheric $CO_2$, to provide hydrocarbon fuel.

FIG. 9 shows another different cycle, where the recovered hydrogen is fed into a Sabatier process, along with atmospheric $CO_2$, to generate methane. Such methane can be used as a substitute for natural gas.

DETAILED DESCRIPTION OF SAMPLE EMBODIMENTS

The numerous innovative teachings of the present application will be described with particular reference to presently preferred embodiments (by way of example, and not of limitation). The present application describes several inventions, and none of the statements below should be taken as limiting the claims generally.

Figure 1:
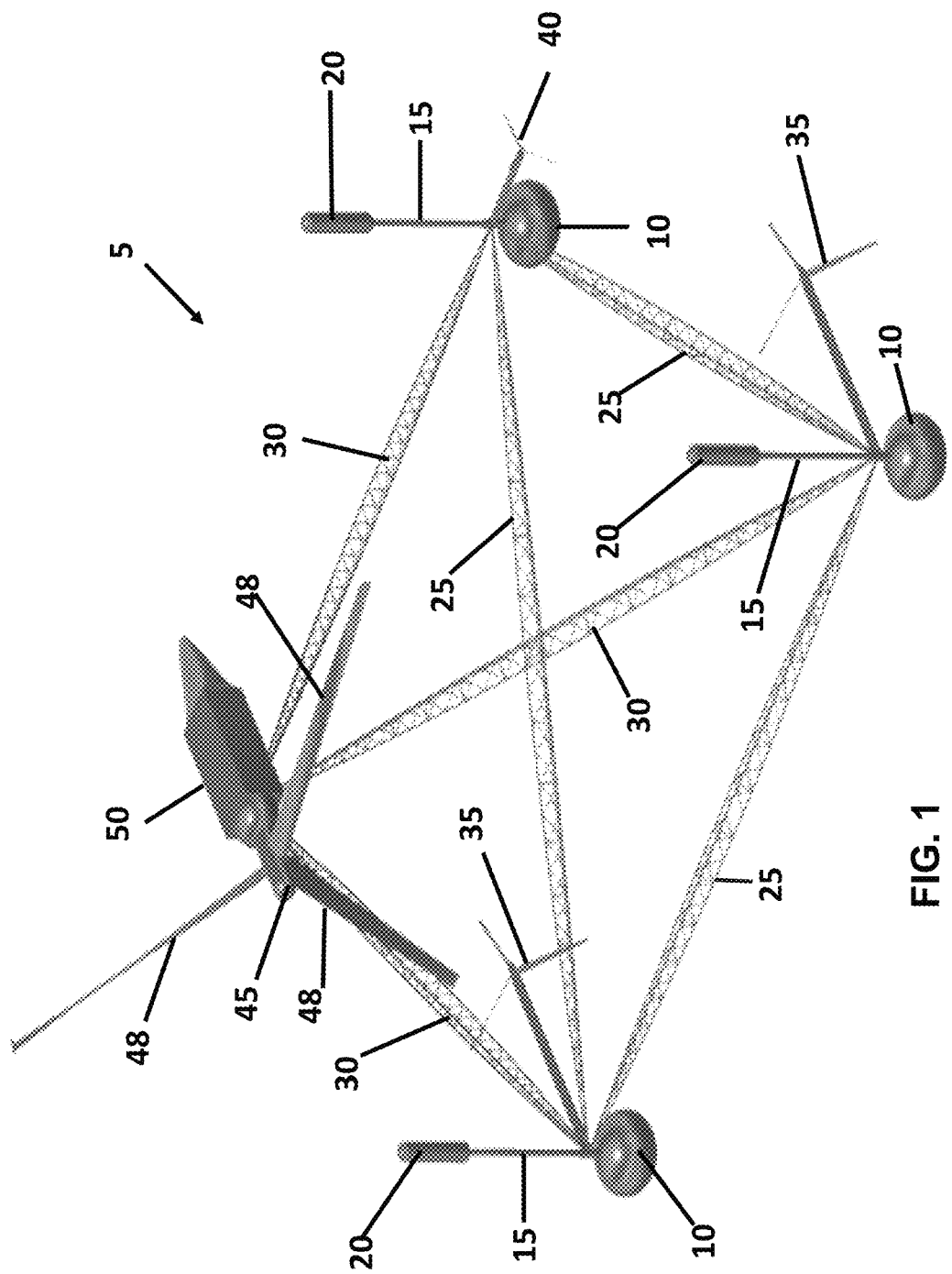
FIG. 1 shows an example of a stabilized free-floating wind turbine system.

In a sample preferred implementation, as shown in FIG. 1, the floating wind energy system has a structural framework that includes lateral support beams 25 below the surface connected together to form a rigid polyagonal structure, and with vertical support beams 30 each connected to extend between a respective part of the polygonal structure and a turbine support location. A wind turbine having a nacelle 50 can optionally be mounted on the turbine support location on the uppermost part of the structural framework, with a hub 45 rotatably connected to the nacelle and multiple wind turbine blades 48 mounted to the hub 45, and an internal generator within the nacelle 50 driven by rotation of the hub, and propellers 35 driven by electric motors (not shown), can optionally be attached as shown. The overall structure is a conventional tripod, except that the lateral support beams 25 are added, to hold the tripod together at its base. The lateral support beams 25 are well below the surface, which reduces the wave forces on them.

A float 20 and stabilizer 10 system is attached to each of the three corners formed by lateral support beams 25 and forms a spring-mass-damper system by being operatively connected to the stabilizer shell 10 by a tension element 20 and a flexible joint 18 (not shown in FIG. 1 because of their small size but shown clearly in FIG. 3), and each float 20 floats at the ocean surface well above its respective stabilizer shell 10 which is below the ocean surface. Said flexible joint 18 might be a u-joint, flexible cable, or equivalent. Each Float/Stabilizer forms a spring-mass-damper system which isolates the structure from wave motion since the float 20 and stabilizer 10 vertical (heave) resonant frequency is substantially lower than the lowest wave frequency (typically ½ or less). The stabilizers 10 entrain large amounts of seawater as their primary source of mass and can be hollow spheres although other structural shapes are possible, including flat plates, while the floats 20 act like springs due to their buoyancy. The flexible joints 18 (not shown in FIG. 1 but shown clearly in FIG. 3) allow the floats 20 to move horizontally with the waves, which greatly reduces lateral loading on the structure and eliminates bending moments on the tension elements 15 at the base while still providing vertical support.

Figure 3:
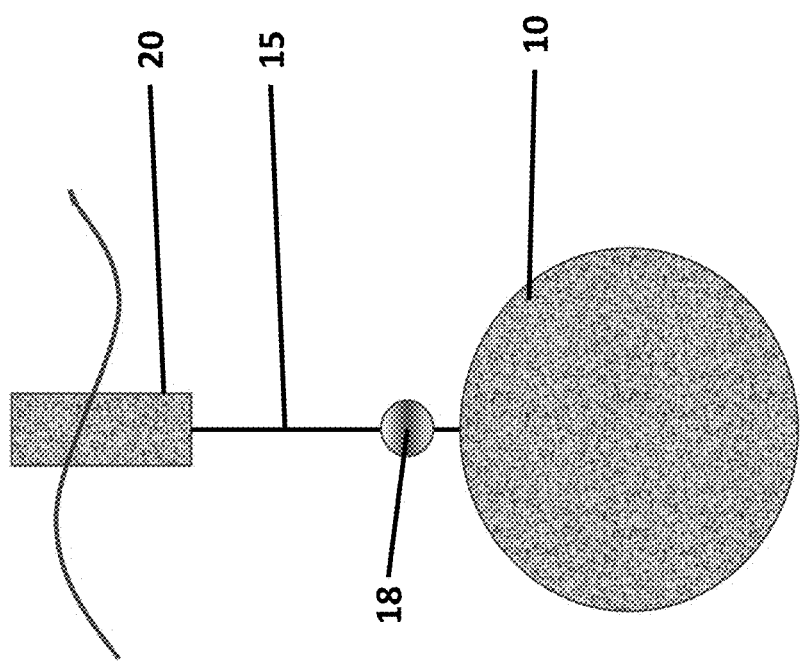
FIG. 3 illustrates how the stabilizing mass, in combination with the restoring force provided by the float, provides a mechanical resonator system. The very large value of the stabilizing mass means that the resonant frequency will be relatively low. Note also that this resonator will have a very significant damping component.

FIG. 3 illustrates how each stabilizing mass 10, in combination with the restoring force provided by its respective float 20, and the connecting tension element 15 between them, provides a mechanical resonator system. The very large value of the stabilizing mass means that the resonant frequency will be relatively low. Note also that this resonator will have a very significant damping component. FIG. 3 also illustrates the flexible joints 18 in each of the float and stabilizing mass systems which are not clearly visible in FIG. 1 because of their small size and join the connecting tension elements 15 to the stabilizing masses 10. The flexible joints 18 allow the floats 20 to move horizontally with the waves, which greatly reduces lateral loading on the structure and eliminates bending moments on the tension elements 15 at the base while still providing vertical support.

Propellers are used in the free-floating configuration to keep the platform stationary in the presence of currents and thrust from the turbine. The propellers are typically large so as to move large volumes of water with a minimal amount of power. The propellers are also used to turn the entire platform into the wind. An optional, third propeller, smaller than the two main propellers, can be mounted on the aft joint and pointed laterally, so as to generate a sideways thrust which may be used to keep the platform stationary in the presence of a side-ways current, or to move the platform sideways.

The attached turbine is mounted at the apex of the tripod to minimize any moment loads on the upper trusses.

Power can be transmitted off of the platform via undersea electric power cable, or the on-board power may be used to generate fuels on-board which are stored and periodically removed by ship.

The present application discloses a low specific mass, free-floating, open ocean, wind energy concept with nominal power capacity of 10 MW or more, on-board liquid fuels generation, and with operational and survival wave heights to 12 and 40 meters respectively. The estimated specific structural mass of 42 kG/kWp is about ⅓ of the specific mass of much smaller land-based turbines, and less than 6% of the specific structural mass of existing off-shore floating wind turbines. The turbine platform may be operated untethered in the open ocean using about 8% of the generated power, on average, for active station keeping. The generated energy may be stored on board via hydrogen electrolysis and liquification for periodic tanker unloading. Reduction of moment loads in the nacelle support structure as well as the unique deep-water foundation result in the low specific mass and high stability.

Nomenclature

In the following discussion, symbols are used as follows:

P power
T thrust
S area of turbine or propeller
υ fluid velocity
f frequency
k vertical compliance of floats
m mass of water in stabilizers
ṁ in mass flow rate
ρ p density
Vp velocity through the turbine or propeller
Ve exit velocity
Vo free stream velocity
e efficiency
Wp peak power
h height above still water level or depth
α Hellman exponent
H wave height (in)
g gravity (m/s^2)
X fetch (m)
U wind speed (m/s)
λ wavelength (m)
t wave period (s)
R radius of underwater wave response
A wave amplitude—one half of wave height.

Goal

Ocean based wind turbines could harness the vast and consistent wind energy available on the world's oceans between the 40th and 60th north and south latitudes, with the Southern Ocean and adjacent seas offering over 40 million square kilometers with the highest surface wind speeds on the planet. This is 7.8% of the earth's surface area. The available energy density there is reported at 4 W/m^2 of ocean surface on a mean annual basis, for an available average power of 160 TW (160 E12 W), which is a multiple of 58 over the world electric power production of 24,000 TW-hr/year, or 2.73 TW average.

Converting the 82 million barrel/day of world oil production into power at 30% efficiency yields about 14,000 TW-hr/yr final use power, most of which is used for transportation. Adding this to the world electric power production gives a total of 38,000 TW-hr/year, or 4.33 TW average. This could be supplied by 360,000, 40 MW Hi-Seas Turbines at 60% capacity factor and 50% turbine-output-to-final-use efficiency. This is a total of about 9.6 TW of turbine power, on average, or only 6% of the available 160 TW described above. In this scenario each turbine would have about 111 km$^2$ of ocean (10.5 km spacing), suggesting a minimal impact on wind speed. About 10 million square kilometers in the north Pacific and Atlantic oceans also have significant wind energy in a relatively benign environment of low currents and moderate temperatures. Given the large number of machines required, it becomes apparent that the structural mass of each turbine must be minimized so as not to consume a large fraction of the world's steel production.

Such turbines must
- Have stability to operate in up to 12 meters significant wave height and survive peak waves to 40 meters.
- Survive winds to 150 km/hr.
- Have some means of position maintenance and orientation.
- Generate energy to either be exported from the platform as via electric power cable, or to store on-board as a liquid, to be off-loaded periodically for shipment to shore, with high efficiency and low cost, to be converted to electric power and fuels.
- Have minimal material requirements per unit of power.
- Have a large power rating per turbine for efficiencies of scale; and
- Be cost competitive with fossil fuels.

Overview

The present application discloses a new approach to these needs, preferably utilizing the following features
- A tripod type nacelle support of steel trusses that eliminates the large moments that fixed-based towers are subjected to.
- Dynamic stability provided by the inertia of Stabilizers consisting of large volumes of sea water in thin-walled steel-strut supported fiberglass spheres, forming a dynamically stable base. The base is deep enough to be below most wave motion.
- Static stability provided by tall, slender floats supported by narrow vertical columns attached to the Stabilizers with universal joints above the base connection allowing for free lateral movement of the floats, thereby decoupling surface lateral wave motion from the deep base.
- A pair of large "propellers" to counter the wind thrust to keep the turbine stationary in the deep ocean without the use of multi-km long anchor lines. These propellers are large enough to require only about 10% of the produced wind power at or below rated wind speed in a 0.2 m/s current which is counter to the wind direction. With no current counter to the wind direction about 8% of the turbine power is needed. Turbine thrust falls with wind speeds above rating, thereby requiring less propeller power. The propellers may be omitted in seas shallow enough to allow anchoring.
- A relatively small, low power, aft-mounted side-thruster is used to keep the platform stationary in cross-flow currents, or for lateral motion through the ocean. The thruster is also used with the propellers to keep the turbine oriented into the wind.
- Connection to electric power cable or use of on-board water electrolysis and conversion of the produced hydrogen to a liquid form (liquid hydrogen, ammonia, methanol, or Liquid Organic Hydrocarbon Carrier—LOHC). Hydrolysis and LOHC hydrogenation are housed in the expanded nacelle with LOHC storage in tanks within the front two stabilizers.
- Autonomous operation and station keeping, including self-deployment over thousands of kilometers. The turbine can move through the water in any direction under wind power via the propellers and thruster, including up to 1.6 m/s (5.7 km/hr) directly into the wind with rated wind speed.
- On or near-shore based construction and assembly.
- An optional, but possibly valuable feature in terms of mass and cost savings, are blade tip mounted turbo-prop-like micro-turbine/generators that convert the nominally 120 m/s air velocity at the blade tips into electric power at high rotational speed. This reduces the high moments on the blade root and hub, and most of the step-up gear mass and cost.

Example of Turbine Parameters

In one example implementation, this ocean going, free-floating turbine is projected to have a specific structural mass, excluding ballast, of less than 42 kg/kWp and to be built in sizes up to 40 MW nominal and 44.5 MW peak. Much smaller land-based turbines are known to have a specific structural mass of about 140 kG/kW, or over three times more. The recently deployed 6 MW HyWind floating turbine has a reported structural mass of 5420 tons, or 820 kG/kW. With fabricated steel nominally at US $2 per kG, for off-shore wind to be economically competitive the structural mass must be minimized while maintaining stability. If deployed over a 20 year time span, the 360,000 ocean-going turbines would need only 2% of the 1700 million tons of animal global steel production.

- Nominal Net Power—40 MW
- Turbine peak power production—44.5 MWp
- Capacity factor—>60% on nominal power
- Structural mass—1825 tons (42 kG/kW)
- Fuel processing mass—200 tons (assumed)
- Ballast—260 tons (aft)
- Displacement—2284 tons (total mass)
- Rated wind speed at 10 meters elevation—11.3 m/s
- Hub height—170 m over mean sea level
- Rated wind speed at hub height—15.0 m/s
- Rotor diameter—250 m
- Blade tip speed ratio—8
- Rotor RPM—9.16
- Velocity ratio=Ve/Vo=0.49
- Turbine efficiency—77% (after P(Ve/Vo) calculation)
- Blade tip micro-turbine diameter and power—7.8 meters, 3 each at 14.83 MW
- Nominal micro-turbine RPM—580
- Propellers diameter—70 m
- Thruster diameter—30 m
- Propeller power at rated wind speed and ocean current of 0.2 m/s and 79% efficiency—2.25 MW each, 4.5 MW total
- Propeller maximum power—3.3 MW each. 6.6 MW total
- Thruster maximum power—855 kW
- Net power production at rated wind speed with 0.2 m/s Current—40 MW
Turbine thrust at rated wind speed—580 tons
Distance from front floats to rear float—250 m
Distance between front floats—300 m
Nominal Stabilizer Sphere depth—100 m
Stabilizer Spheres diameter—27 m
Mass of water in each sphere—11,600 tons (10E6 kg)
Float height—30 m on cylindrical section
Float diameter—6.5 M
Float vertical compliance—334 kN/m
Platform tilt from maximum wind thrust—5.1 degrees (corrected to zero via buoyancy control)
Natural vertical frequency (heave) of each sphere/float—36 seconds
Power, Thrust, and Station-Keeping The disclosed turbine in its free-floating configuration must have a means to cancel the thrust from the turbine. This is done with a pair of large "propellers". Since water is three orders of magnitude denser than air, it is feasible to move large quantities of water at low delta velocities and low power to counteract the thrust from the turbine.

In the presence of a 0.2 m/s current (a typical current in the Southern Ocean), a pair of 70 meter diameter propellers may be used to impart a 0.96 m/s delta velocity to the sea water to generate the 580 tons of thrust from the turbine at rated wind speed of 15 m/s, using 4.5 MW of power at 79% efficiency, or about 10% of the generated power.

Figure 4:
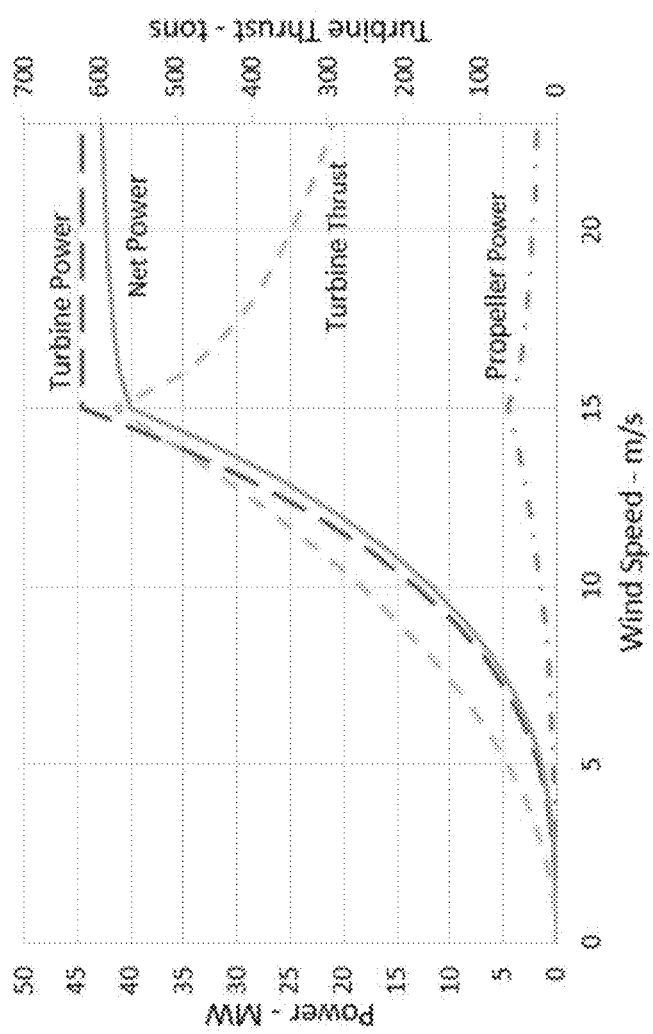
FIG. 4 graphically shows how thrust drops quickly for wind speeds higher than rated, as the turbine velocity ratio increases to keep turbine power constant via variable pitch blades.

The results are shown in FIG. 4. Thrust drops quickly with wind speeds higher than rated as the turbine velocity ratio increases to keep turbine power constant via variable pitch blades. Note that net power reaches 42.7 MW at 23 m/s wind speed since the thrust at that speed is only 294 tons—a 50% drop from the peak thrust—and propeller power drops to 1.76 MW. Thus, the average propeller power may be less than 10% of the generated power.

A 30 m diameter side thruster is located aft, and oriented perpendicular to the platform direction. Its function, in conjunction with the propellers, is to keep the platform stationary in a current which has a cross-flow component of velocity. Since the thruster has only to produce enough thrust to counter drag, it is relatively small and low powered (855 kW max power), yet can keep the platform stationary in cross currents up to 1.6 m/s or move the platform sideways at that speed. Operating the propellers differentially counters the platform torque produced by the thruster.

FIG. 5 shows net power vs current speed or motion for wind co-directional with the current and for current or motion perpendicular to the wind. For the former, the propeller becomes power limited at 0.6 m/s current (or forward motion), after which point the turbine blades are progressively feathered to reduce thrust, which reduces net power.

The latter situation (current or motion perpendicular to the wind) is seen to be quite different, as very little extra power for station keeping is needed in that case. Thus, at any given location with a high current, the net power will be an average of these curves as wind and current change direction relative to each other. However, in the Southern Ocean, currents greater than 0.6 m/s constitute only a small fraction of the ocean, possibly less than 1%.

Using wind direction sensing as is done with conventional turbines, the thruster and propellers work to apply torque to the platform as needed to keep the turbine pointed into the wind. Thus, instead of turning the nacelle on a tower, the entire platform is rotated into the wind. This is the primary reason why this concept has a low specific mass.

The mass of head and structure is borne by the forward floats and stabilizers, with some air in the forward stabilizers if needed. Head mass and center of gravity doesn't determine stability like in a mono-hull ship. It's more like a multi-hull vessel with the distributed floatation.

If the front floats are 5 meters in diameter, and are 30 meters high, they have displacement when half submerged of 647 tons. If the total load is more than that (and it will be as ballast is added as needed), then some air is pumped into the forward stabilizers to keep the floats half submerged. Then as the turbine operates and generates thrust, the aft float goes down, and the front floats go up. Then air is released from the front stabilizers and injected into the aft stabilizer to keep all floats half submerged. The aft stabilizer has ballast mass added which is about equal to the turbine thrust, in order to have the aft float centered vertically (half submerged) with no thrust.

Turbine thrust is actively controlled (blade pitch) to keep it from changing too quickly, to allow the active buoyancy controls to keep the floats centered vertically. But the floats have enough reserve to accommodate a 100% step change in thrust without submerging completely, thus maintaining static stability. If something goes wrong and a float gets submerged, the large tilting of the platform will reduce the thrust and limit the tilt. Also, there are two other ways to reduce thrust—1) stop the blades with mechanical or electrical breaking, and 2) rotate the platform out of the wind.

The generating systems described above generate significant power output in very remote locations. There are several ways to accumulate and transport energy from such a generating system to locations where the energy can be sold. These will be described very briefly, to indicate how the energy from such a generating system can be brought to market.

Figure 2:
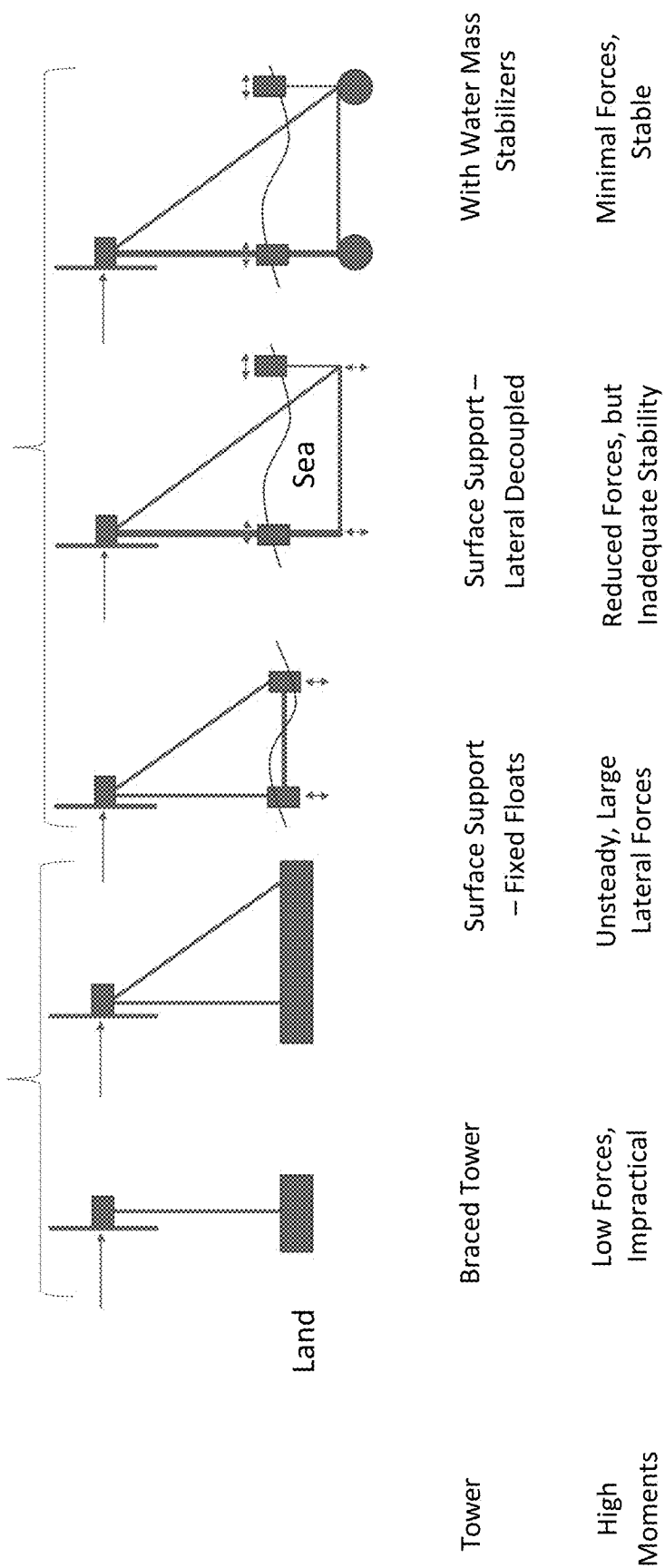
FIG. 2 schematically shows how structural geometries for supporting a large and heavy wind turbine head portion have evolved.

FIG. 2 schematically shows how structural geometries for supporting a large and heavy wind turbine head portion have evolved.

Energy Transport

The simplest way, for near-shore locations, is to transmit power over a cable. However, this would not be economical in far-offshore locations.

Another way is electrolysis of seawater to produce hydrogen. Hydrogen can be transported using a metal adsorbent, or under high pressure. More preferably, the hydrogen can be used to hydrogenate an energy feedstock (such as toluene) to produce a product (e.g. methylcyclohexane) which can be dehydrogenated after transportation.

FIG. 5 shows how multiple turbines can be connected to one fuel processing platform. In this example, ten 30 MW turbines are all connected to a single fuel processing platform.

FIG. 6 shows how such a platform can operate. In this example, liquid toluene is shipped out to the wind turbine platform, where it is stored for conversion. The power from the wind turbine is used to electrolyze seawater and generate hydrogen, and the hydrogen is used to alter the chemistry of the toluene to methylcyclohexane. (Other chemical processes can also be used to take up hydrogen for transport.) Such a cycle is referred to as a liquid organic hydrocarbon cycle ("LOHC").

FIG. 7 summarizes a complete wind-to-grid flow. Hydrogenation is performed at the far-offshore generation site, and the hydrogenated stock is transported to a shore facility for dehydrogenation. In this example, the hydrogen released by dehydrogenation feeds a protonic fuel cell, to directly generate DC power. This power is then converted and fed into the grid.

FIG. 8 shows a different cycle, where the recovered hydrogen is fed into a Fischer-Tropf process, along with atmospheric $CO_2$, to provide hydrocarbon fuel.

FIG. 9 shows another different cycle, where the recovered hydrogen is fed into a Sabatier process, along with atmospheric $CO_2$, to generate methane. Such methane can be used as a substitute for natural gas.

Advantages

The disclosed innovations, in various embodiments, provide one or more of at least the following advantages. However, not all of these advantages result from every one of the innovations disclosed, and this list of advantages does not limit the various claimed inventions.

Improved cost efficiency in wind energy;
Efficient collection of energy from remote locations;
Long service lifetime;
Ability to evade hurricanes; and
Minimizing ecological damage.

According to some but not necessarily all embodiments, there is provided: A floating wind energy system which does not need mooring, anchoring, tethering, nor seabed foundations, comprising a structural framework which includes both lateral support beams connected together to form a substantially rigid polygonal structure, and vertical support beams each connected to extend between a respective part of the polygonal structure and a turbine support location; a wind turbine having a nacelle mounted to the turbine support location, a hub rotatably connected to the nacelle, multiple wind turbine blades mounted to the hub, and a generator driven by rotation of the hub; and a plurality of stabilizer subsystems mounted to the structural framework, and each comprising a stabilizing mass, and a float which is operatively connected to the stabilizer shell by a tension element, and which floats at the ocean surface; wherein the mass and the float, in combination, have a resonant frequency which is less than half the normal minimum frequency of waves where the system is positioned;

According to some but not necessarily all embodiments, there is provided: A floating wind energy system which does not need mooring, anchoring, tethering, nor seabed foundations, comprising: a structural framework which includes both lateral support beams connected together to form a substantially rigid polygonal structure, and vertical support beams each connected to extend between a respective part of the polygonal structure and a turbine support location; a wind turbine having a nacelle mounted to the turbine support location, a hub rotatably connected to the nacelle, multiple wind turbine blades mounted to the hub, and a generator driven by rotation of the hub; and a plurality of stabilizer subsystems mounted to the structural framework, and each comprising a stabilizer shell filled with water, and a float which is operatively connected to the stabilizer shell by a tension element and a flexible joint, and which floats at the ocean surface above the stabilizer shell.

According to some but not necessarily all embodiments, there is provided: A floating wind energy system which does not need mooring, anchoring, tethering, nor seabed foundations, comprising: a structural framework which includes both lateral support beams connected together to form a substantially rigid polygonal structure, and vertical support beams each connected to extend between a respective part of the polygonal structure and a turbine support location; a wind turbine having a nacelle mounted to the turbine support location, a hub rotatably connected to the nacelle, multiple wind turbine blades mounted to the hub, and a generator driven by rotation of the hub; and a plurality of stabilizer subsystems mounted to the structural framework, and each comprising a stabilizing mass, and a float which is operatively connected to the stabilizing mass by a tension element, and which floats at the ocean surface above the stabilizer shell; and electric propulsion units mounted to the structural framework, and operatively connected to receive power directly or indirectly from the wind turbine; wherein each of the stabilizer subsystems has a natural heave frequency which is less than the normal minimum frequency of local wave motion.

According to some but not necessarily all embodiments, there is provided: a floating wind energy system which does not need mooring, anchoring, tethering, nor seabed foundations, comprising: a structural framework which includes both lateral support beams connected together to form a substantially rigid polygonal structure, and vertical support beams each connected to extend between a respective part of the polygonal structure and a turbine support location; a wind turbine having a nacelle mounted to the turbine support location, a hub rotatably connected to the nacelle, multiple wind turbine blades mounted to the hub, and a generator driven by rotation of the hub; and a plurality of stabilizer subsystems mounted to the structural framework, and each comprising a stabilizing mass, and a float which is operatively connected to the stabilizing mass by a tension element and a flexible joint, and which floats at the ocean surface above the stabilizer shell; wherein the mass and the float, in combination, have a resonant frequency which is less than half the normal minimum frequency of waves where the system is positioned; and propulsion units mounted to the structural framework, and operatively connected to receive power directly or indirectly from the wind turbine.

According to some but not necessarily all embodiments, there is provided: A floating platform which does not need mooring, anchoring, tethering, nor seabed foundations, comprising: a structural framework which includes both lateral support beams connected together to form a substantially rigid polygonal structure, and vertical support beams each connected to extend between a respective part of the polygonal structure and a turbine support location; and a plurality of stabilizer subsystems mounted to the structural framework, and each comprising a stabilizing mass comprising a shell filled with water, and a float which is operatively connected to the stabilizer shell by a tension element, and which floats at the ocean surface above the stabilizing mass; and propulsion units mounted to the structural framework, and operatively connected to receive power directly or indirectly from the wind turbine; wherein each of the stabilizer subsystems has a natural heave frequency which is less than the normal minimum frequency of deepwater surface wave motion.

According to some but not necessarily all embodiments, there is provided: A floating platform which does not need mooring, anchoring, tethering, nor seabed foundations, comprising: a structural framework which includes both lateral support beams connected together to form a substantially rigid polygonal structure, and vertical support beams each connected to extend between a respective part of the polygonal structure and a turbine support location; and a plurality of stabilizer subsystems mounted to the structural framework, and each comprising a stabilizing mass, and a float which is operatively connected to the stabilizer shell by a tension element, and which floats at the ocean surface above the stabilizer shell; wherein the mass and the float, in combination, have a resonant frequency which is less than half the normal minimum frequency of waves where the system is positioned.

According to some but not necessarily all embodiments, there is provided: A method of operating a wind turbine in open ocean without anchoring, tethering, or connecting to seabed, comprising: supporting the turbine with a structural framework which includes both subsurface lateral support beams connected together to form a substantially rigid polygonal structure, and vertical support beams each connected to extend between a respective part of the polygonal structure up above the ocean surface to a turbine support location; and stabilizing the structural framework using a plurality of stabilizer subsystems mounted to the structural framework, and each comprising a stabilizing mass, and a float which is operatively connected to the stabilizer shell by a tension element, and which floats at the ocean surface; wherein the mass and the float, in combination, have a resonant frequency which is less than half the normal minimum frequency of ocean surface waves.

According to some but not necessarily all embodiments, there is provided: Methods and systems for operating a stable platform in a far-offshore deep-sea environment. The platform can advantageously be a wind power generation station. A structural framework carries (for example) the wind turbine in an elevated position. Multiple points on the floating structure are connected both to a surface float and to a deep mass (e.g. an enclosed volume of seawater).

Modifications and Variations

As will be recognized by those skilled in the art, the innovative concepts described in the present application can be modified and varied over a tremendous range of applications, and accordingly the scope of patented subject matter is not limited by any of the specific exemplary teachings given. It is intended to embrace all such alternatives, modifications and variations that fall within the spirit and broad scope of the appended claims.

For example, the stabilizer does not necessarily need to be a shell full of water. A flat plate that entrains water can work as well, although it's likely much heavier.

For another example, the blades can optionally be modified to use microrotors at their tips.

None of the description in the present application should be read as implying that any particular element, step, or function is an essential element which must be included in the claim scope: THE SCOPE OF PATENTED SUBJECT MATTER IS DEFINED ONLY BY THE ALLOWED CLAIMS. Moreover, none of these claims are intended to invoke paragraph six of 35 USC section 112 unless the exact words "means for" are followed by a participle.

The claims as filed are intended to be as comprehensive as possible, and NO subject matter is intentionally relinquished, dedicated, or abandoned.

What is claimed is, among others (and, without exclusion, in addition to any other point which are indicated herein as inventive and/or surprising and/or advantageous):

1. A floating wind energy system which does not need mooring, anchoring, tethering, nor seabed foundations, comprising: a structural framework which includes both lateral support beams connected together to form a substantially rigid polygonal structure, and vertical support beams each connected to extend between a respective part of the polygonal structure and a turbine support location; a wind turbine having a nacelle mounted to the turbine support location, a hub rotatably connected to the nacelle, multiple wind turbine blades mounted to the hub, and a generator driven by rotation of the hub; and a plurality of stabilizer subsystems mounted to the structural framework, and each comprising a stabilizing mass, and a float which is operatively connected to a stabilizer shell by a tension element, and which floats at the ocean surface; wherein the mass and the float, in combination, have a resonant frequency which is less than half the normal minimum frequency of waves where the system is positioned.

2. The platform of claim 1, wherein the stabilizing mass is a spherical shell filled with seawater.

3. The platform of claim 1, wherein the lateral support beams define a triangle.

4. The platform of claim 1, further comprising plural propulsion units mounted to the lateral support beams.

5. A floating wind energy system which does not need mooring, anchoring, tethering, nor seabed foundations, comprising:
a structural framework which includes both lateral support beams connected together to form a substantially rigid polygonal structure, and vertical support beams each connected to extend between a respective part of the polygonal structure and a turbine support location;
a wind turbine having a nacelle mounted to the turbine support location, a hub rotatably connected to the nacelle, multiple wind turbine blades mounted to the hub, and a generator driven by rotation of the hub; and
a plurality of stabilizer subsystems mounted to the structural framework, and each comprising
a stabilizer shell filled with water, and
a float which is operatively connected to the stabilizer shell by a tension element and a flexible joint, and which floats at the ocean surface above the stabilizer shell.

6. The platform of claim 5, wherein the lateral support beams define a triangle.

7. The platform of claim 5, further comprising plural propulsion units mounted to the lateral support beams.

8. A floating wind energy system which does not need mooring, anchoring, tethering, nor seabed foundations, comprising: a structural framework which includes both lateral support beams connected together to form a substantially rigid polygonal structure, and vertical support beams each connected to extend between a respective part of the polygonal structure and a turbine support location; a wind turbine having a nacelle mounted to the turbine support location, a hub rotatably connected to the nacelle, multiple wind turbine blades mounted to the hub, and a generator driven by rotation of the hub; and a plurality of stabilizer subsystems mounted to the structural framework, and each comprising a stabilizing mass, and a float which is operatively connected to the stabilizing mass by a tension element, and which floats at the ocean surface above a stabilizer shell; and propulsion units mounted to the structural framework, and operatively connected to receive power directly or indirectly from the wind turbine; wherein each of the stabilizer subsystems has a natural heave frequency which is less than the normal minimum frequency of local wave motion.

9. The platform of claim 8, wherein the stabilizing mass is a spherical shell filled with seawater.

10. The platform of claim 8, wherein the lateral support beams define a triangle.

11. The platform of claim 8, further comprising plural propulsion units mounted to the lateral support beams.

* * * * *